(12) United States Patent
Suzuki

(10) Patent No.: US 7,854,598 B2
(45) Date of Patent: Dec. 21, 2010

(54) FUEL SUPPLY DEVICE HAVING A HEAT SINK SUPPORT

(75) Inventor: Nobuo Suzuki, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 914 days.

(21) Appl. No.: 11/737,801

(22) Filed: Apr. 20, 2007

(65) Prior Publication Data

US 2007/0253845 A1 Nov. 1, 2007

(30) Foreign Application Priority Data

Apr. 27, 2006 (JP) ............................. 2006-123424

(51) Int. Cl.
 F04B 17/00 (2006.01)
 F04B 35/04 (2006.01)
 F02M 37/04 (2006.01)
 E03B 11/00 (2006.01)
(52) U.S. Cl. .................. 417/361; 417/423.3; 417/423.8; 417/423.15; 123/509; 137/571
(58) Field of Classification Search ................. 417/360, 417/361, 423.3, 423.8, 423.15; 123/509; 137/571
See application file for complete search history.

(56) References Cited

U.S. PATENT DOCUMENTS 5,613,844 A * 3/1997 Tuckey et al. ............... 417/366
7,106,593 B2 * 9/2006 Stabile et al. ............... 361/707
7,458,365 B2 * 12/2008 Hazama ...................... 123/509
2005/0100461 A1 5/2005 Izutomi et al.

FOREIGN PATENT DOCUMENTS

| DE | 10 2004 048965 | 6/2005 |
| JP | 2001 099029 | 4/2001 |
| JP | 2005 155602 | 6/2005 |
| JP | 2006 002655 | 1/2006 |

* cited by examiner

Primary Examiner—Charles G Freay
(74) Attorney, Agent, or Firm—Dennison, Schultz & MacDonald

(57) ABSTRACT

An apparatus (20) may comprise a fuel tank (10), a cover (22), a fuel discharging unit (30), a control unit (26), and a heat sink (28). The cover (22) closes an opening (12) in an upper portion of the fuel tank (10). The fuel discharging unit (30) is disposed within the fuel tank (10), and the fuel discharging unit (30) draws fuel into the fuel tank and discharges the drawn fuel outside the fuel tank. A biasing member (25) may be disposed between the fuel discharging unit (30) and the cover (22), and bias the fuel discharging unit (30) toward the bottom surface of the fuel tank (10). The control unit (26) controls the fuel discharging unit (30). The heat sink (28) is thermally connected to the control unit (26), and dissipates heat from the control unit (26). The heat sink (28) may include an extended portion (28b) extending in an up-down direction in the fuel tank (10). The fuel discharging unit (30) may be slidably supported by the extended portion (28b).

3 Claims, 6 Drawing Sheets

29a    29a

FUEL SUPPLY DEVICE HAVING A HEAT SINK SUPPORT

CROSS-REFERENCE TO RELATED APPLICATION

This application claims priority to Japanese Patent Application No. 2006-123424 filed on Apr. 27, 2006, the contents of which are hereby incorporated by reference into the present application.

BACKGROUND OF THE INVENTION

1. Field of the Invention

This invention relates to a fuel supply device for supplying fuel from a fuel tank to an external device.

2. Description of the Related Art

Japanese Laid-Open Patent Publication No. 2005-155602 discloses a fuel supply device. This fuel supply device comprises a cover for closing an upper opening of a fuel tank, two guide members extending in an up-down direction in the fuel tank, and a fuel discharging unit guided by these guide members so as to be vertically movable within the fuel tank. A spring is disposed between the fuel discharging unit and the cover. The spring biases the fuel discharging unit toward the bottom surface of the fuel tank. Therefore, the bottom of the fuel discharging unit is in contact with the bottom surface of the fuel tank. The fuel discharging unit draws fuel in from the fuel tank through an inflow port formed in the bottom part of the fuel discharging unit, and discharges the drawn fuel outside the fuel tank. The fuel discharging unit can thus draw the fuel in the fuel tank through the inflow port even if the level of fuel in the fuel tank becomes low. The cover includes a storage chamber that stores a control unit for controlling the fuel discharging unit and a cooling passage formed adjacent to the storage chamber. When the fuel discharging unit is operating, part of fuel discharged from the fuel discharging unit flows through the cooling passage in order to cool the control unit.

BRIEF SUMMARY OF THE INVENTION

The above-mentioned fuel supply device is adapted to cool the control unit by passing part of the fuel discharged from the fuel discharging unit through the cooling passage. Therefore, when no fuel is discharged from the fuel discharging unit, the control unit cannot be cooled because no fuel flows through the cooling passage.

To solve this problem, it is possible to consider providing a heat sink in order to dissipate the heat of the control unit. Namely, the control unit could be cooled by the heat sink. However, the fuel supply device includes a number of members such as the guide members for guiding the fuel discharging unit in the vertical direction of the fuel tank. Such members are disposed as closely as possible to miniaturize the fuel supply device. This consequently makes it difficult to position a heat sink, with a high radiating performance (e.g., a heat sink having a large surface area), in the fuel supply device.

It is, accordingly, one object of the present teachings to provide a fuel supply device, in which a heat sink with a high radiating performance can be arranged without enlarging the fuel supply device.

In one aspect of the present teachings, an apparatus comprises a fuel tank, a cover, and a fuel discharging unit. The cover is attached to the fuel tank. The cover closes an opening formed in an upper portion of the fuel tank. The fuel discharging unit is disposed within the fuel tank. The fuel discharging unit draws fuel from the fuel tank and discharges the drawn fuel outside the fuel tank. A biasing member may be disposed between the cover and the fuel discharging unit. The biasing member biases the fuel discharging unit toward a bottom surface of the fuel tank. The apparatus further comprises a control unit for controlling the fuel discharging unit, and a heat sink thermally connected to the control unit. The heat sink dissipates heat from the control unit. The heat sink includes an extended portion extending in an up-down direction in the fuel tank. The fuel discharging unit is slidably supported by the extended portion.

In this apparatus, the extended portion of the heat sink functions as a guide member. By making the extended portion of the heat sink function as the guide member, a heat sink that has a larger capacity and the larger surface area can be disposed within the apparatus without enlarging the apparatus itself. Consequently, heat generated in the control unit can be suitably dissipated.

It may be preferred that the fuel discharging unit comprise a reserve cup for storing fuel, and that a leading edge of the extended portion is positioned in the fuel stored in the reserve cup when the reserve cup stores fuel.

Such a structure of the apparatus enables the dissipation of heat from the leading edge of the extended portion into the fuel in the reserve cup. Since the fuel in the reserve cup has a lower temperature, compared with the heat sink, the heat dissipates from the leading edge of the extended portion into the fuel. Consequently, the control unit is more effectively cooled.

It may be preferred that the extended portion is formed in a plate-like shape.

Such a structure of the apparatus can prevent axial rotation of the fuel discharging unit relative to the extended portion of the heat sink. Consequently, the fuel discharging unit can be accurately disposed.

In another aspect of the present teachings, a fuel supply device comprises a cover attached to a fuel tank, and a fuel discharging unit disposed underneath the cover. The cover closes an opening formed in an upper portion of the fuel tank. The fuel discharging unit is located within the fuel tank when the fuel supply device is attached to the fuel tank. The fuel discharging unit draws fuel from the fuel tank and discharges the drawn fuel outside the fuel tank. A biasing member may be disposed between the cover and the fuel discharging unit. The biasing member biases the fuel discharging unit downward. The fuel supply device further comprises a control unit for controlling the fuel discharging unit, and a heat sink thermally connected to the control unit. The heat sink dissipates heat from the control unit. The heat sink includes an extended portion extending in an up-down direction in the fuel tank. The fuel discharging unit is slidably supported by the extended portion.

In this fuel supply device, the extended portion of the heat sink functions as a guide member. Consequently, the capacity and surface area of the heat sink can be increased without enlarging the device itself.

These aspects and features may be utilized singularly or in combination in order to produce an improved fuel supply device. In addition, other objects, features and advantages from the present teachings will be readily understood after reading the following detailed description together with the accompanying drawings and claims. Of course, the additional features and aspects disclosed herein also may be utilized singularly or in combination with the above-described aspects and features.

DETAILED DESCRIPTION OF THE INVENTION

A preferred embodiment which will be described later in detail has following features.

(Feature 1) The fuel supply device is attached to a fuel tank.

(Feature 2) The fuel supply device comprises a heat sink. The heat sink includes an extended portion extending downward from a cover.

(Feature 3) The fuel supply device comprises a fuel discharging unit. The fuel discharging unit is supported so as to be vertically movable within the fuel tank by being engaged with the extended portion of the heat sink and a guide member.

(Feature 4) The fuel discharging unit comprises a reserve cup for storing fuel and a pump disposed within the reserve cup, the pump drawing the fuel from the reserve cup and discharging the drawn fuel.

(Feature 5) A leading edge of the extended portion is immersed in the fuel within the reserve cup when the reserve cup stores fuel.

(Feature 6) The extended portion of the heat sink is formed in a plate-like shape.

(Feature 7) The fuel supply device comprises a fuel discharge nozzle for discharging part of the fuel drawn by the fuel discharging unit toward the extended portion.

(Feature 8) The fuel discharge nozzle is formed so as to discharge the fuel across a substantial proportion of the entire lateral area of the extended portion formed in the plate-like shape.

Embodiment

Figure 1:
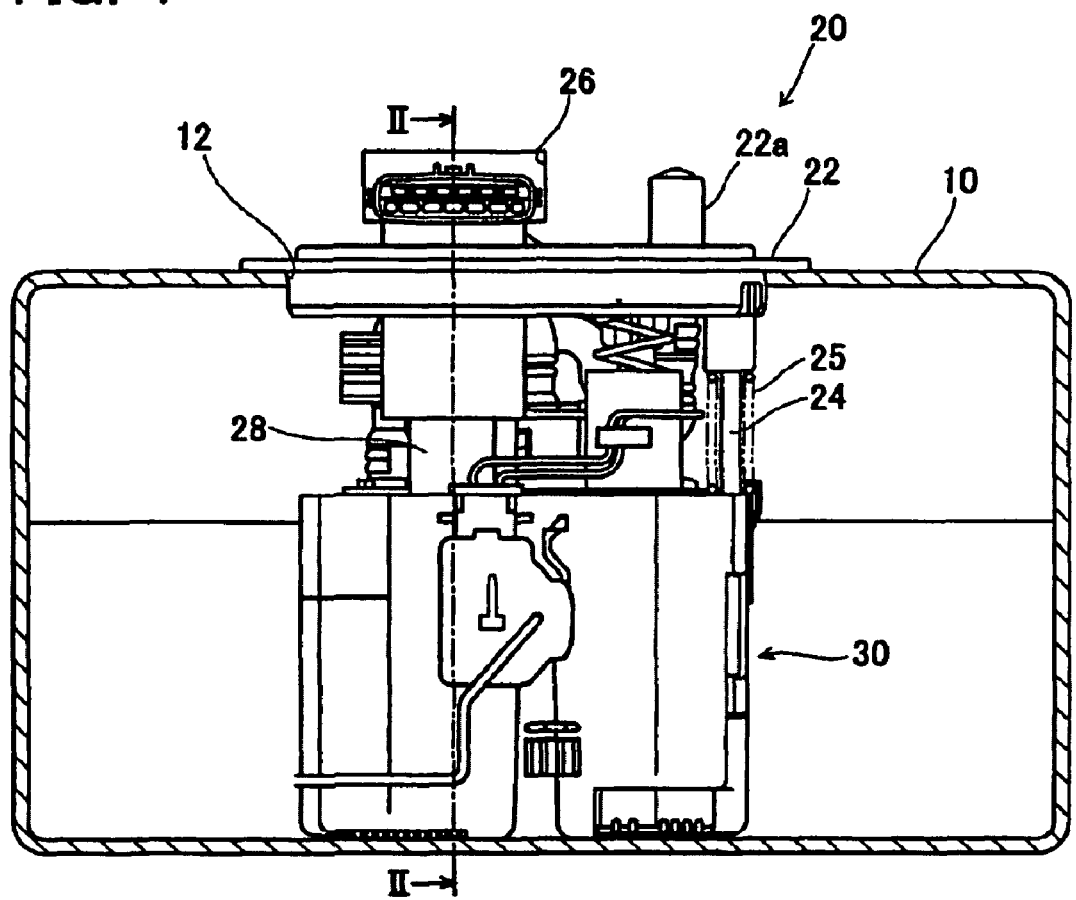
FIG. 1 is a side view of a fuel supply device 20 of a preferred embodiment of the present teachings.

A fuel supply device 20 according to this preferred embodiment of the present teachings will be described in reference to the accompanying drawings. As shown in FIG. 1, the fuel supply device 20 is used when attached to a fuel tank 10 of an automobile or the like. The fuel supply device 20 draws fuel from within the fuel tank 10 and supplies the drawn fuel to an engine of the automobile or the like. The fuel supply device 20 comprises a cover 22, a guide 24, a fuel discharging unit 30, a spring 25, a controller 26 and a heat sink 28.

The cover 22 is attached to the fuel tank 10 so as to close an opening 12 formed in an upper portion of the fuel tank 10. The cover 22 includes a fuel discharge port 22*a*. One end of a fuel supply pipe, not shown, for supplying fuel to the engine is connected to the upper end of the fuel discharge port 22*a*. A pipe 60 of the fuel discharging unit 30 is connected to the lower end of the fuel discharge port 22*a*. The fuel from the fuel discharging unit 30 enters the fuel discharge port 22*a* through the pipe 60. The fuel which entered the fuel discharge port 22*a* is supplied to the engine through the fuel supply pipe.

A base end of the guide 24 is fixed to the lower surface of the cover 22. The guide 24 is a bar-like member which extends downward (i.e., towards the bottom surface of the fuel tank 10) from the cover 22. The fuel discharging unit 30 is attached to the lower end of the guide 24.

The spring 25 is disposed between the cover 22 and the fuel discharging unit 30. The spring 25 is disposed so that the guide 24 is inserted through the spring 25. The spring 25 is compressed between the cover 22 and the fuel discharging unit 30. Accordingly, the spring 25 biases the fuel discharging unit 30 downward.

Figure 2:
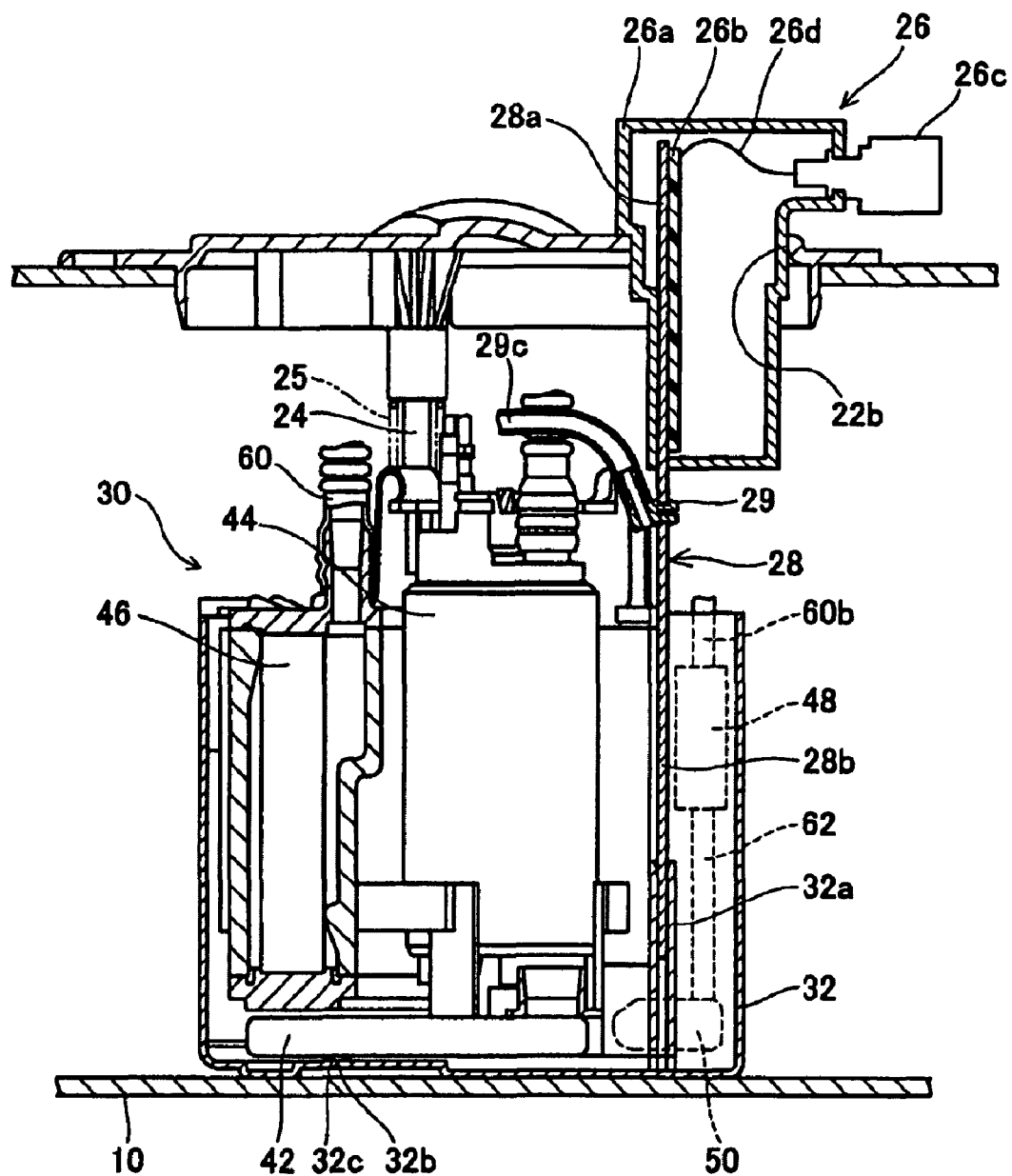
FIG. 2 is a cross-sectional view of the fuel supply device 20 along the line II-II of FIG. 1.

As shown in FIG. 2, the cover 22 includes a through-hole 22*b*, and a fuel pump controller 26 is attached to the through-hole 22*b*. The fuel pump controller 26 is electrically connected to a fuel pump 44 of the fuel discharging unit 30. The fuel pump controller 26 receives power supplied by an external power source not shown. The fuel pump controller 26 controls the operation of the fuel discharging unit 30 by controlling the power supplied to the fuel pump 44.

The fuel pump controller 26 comprises a case 26*a*, a circuit board 26*b*, and a connector 26*c*. The case 26*a* is fixed to the cover 22 by being inserted into the through-hole 22*b* of the cover 22. The circuit board 26*b* and the connector 26*c* are fixed to the case 26*a*. The connector 26*c* is fixed to the upper side surface of the case 26*a*. The connector 26*c* is electrically connected to the circuit board 26*b* by a wire 26*d*. The connector 26*c* receives power supplied by the external power source. The power supplied from the external power source to the connector 26*c* is supplied to the circuit board 26*b*.

The circuit board 26*b* is disposed within the case 26*a*. The circuit board 26*b* includes an electric circuit, not shown, constituted by a number of electric and electronic elements and a wiring configuration. The circuit board 26*b* is electrically connected to the fuel pump 44 by a wire not shown. The circuit board 26*b* receives power supplied by the external power source through the connector 26*c*. The circuit board 26*b* supplies power to the fuel pump 44 thus enabling it to control the drive of the fuel pump 44.

The heat sink 28 is attached to the fuel pump controller 26. The heat sink 28 is a substantially rectangular plate-like member which extends in a vertical direction. The heat sink 28 is formed from a metal that has high heat conductivity (copper in this embodiment). One surface of the upper end 28*a* of the heat sink 28 is closely fitted to the circuit board 26*b*, and the other surface of the upper end 28*a* of the heat sink 28 is attached to the case 26*a*. The heat sink 28 is insulated from the electric circuit of the circuit board 26*b*. The fuel discharging unit 30 is attached to the lower end 28*b* of the heat sink 28.

Figure 4:
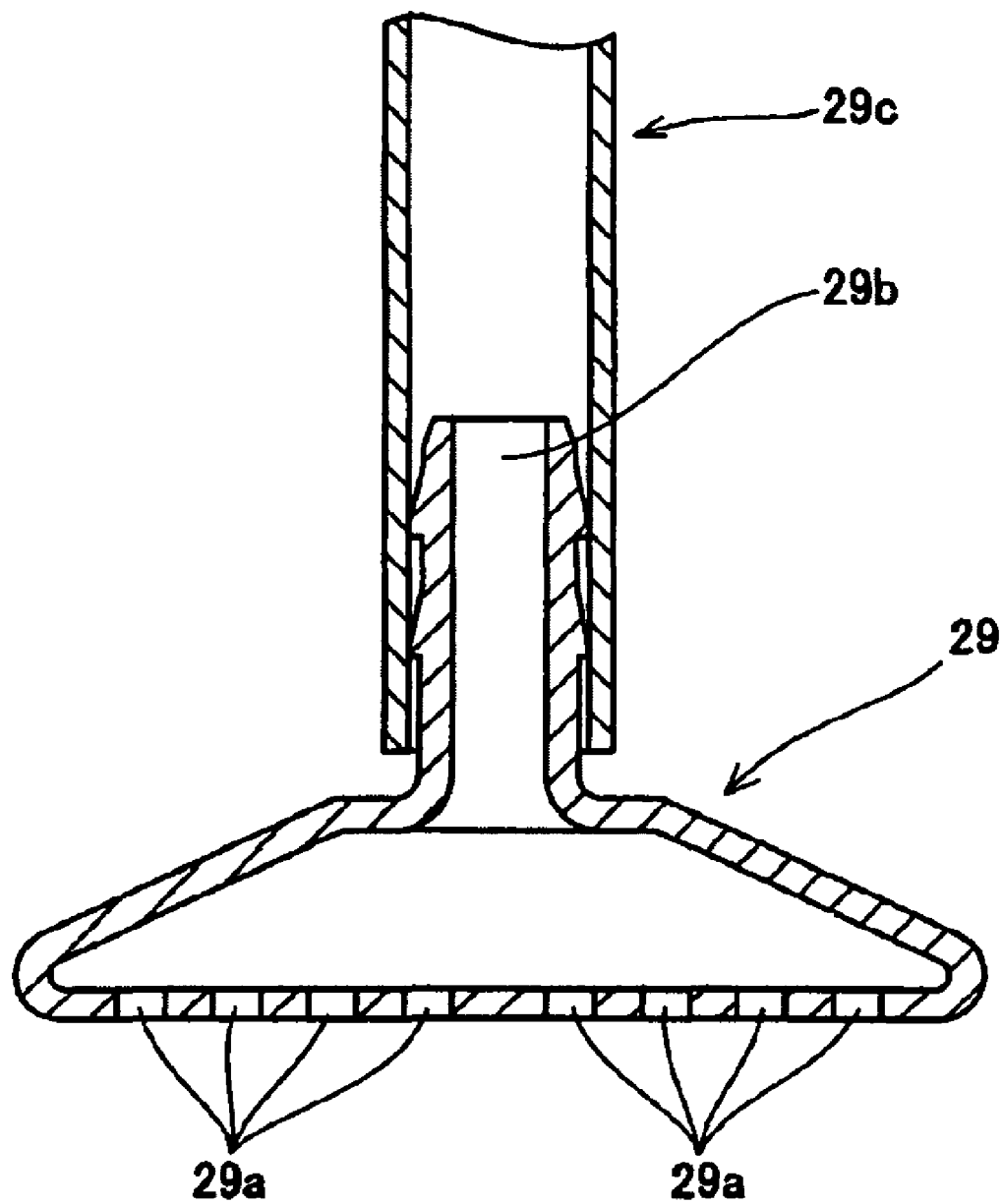
FIG. 4 is a cross-sectional view of a fuel discharge nozzle 29.

The fuel discharge nozzle 29 is attached to the heat sink 28 by a so-called snap fit structure. The fuel discharge nozzle 29 includes an inflow port 29*b* and a plurality of outlet ports 29*a* aligned as shown in FIG. 4. The fuel discharge nozzle 29 is attached so that each outlet port 29*a* is pointed toward the heat sink 28 and so that each outlet port 29*a* is aligned along the lateral direction of the heat sink 28. A pipe 29*c* of the fuel discharging unit 30 is connected to the inflow port 29*b*. Part of the fuel discharged from the fuel discharging unit 30 enters the fuel discharge nozzle 29 through the pipe 29*c*. The fuel which entered the fuel discharge nozzle 29 is discharged toward the heat sink 28 through each outlet port 29*a*.

The fuel discharging unit 30 is disposed under the cover 22 within the fuel tank 10, and attached so as to be vertically movable. The fuel discharging unit 30 can move vertically within the fuel tank 10 by being guided by the guide 24 and the heat sink 28.

The fuel discharging unit 30 draws fuel in from the fuel tank 10 and discharges the drawn fuel outside the fuel tank 10. As shown in FIG. 2, the fuel discharging unit 30 comprises a reserve cup 32, a suction filter 42, a fuel pump 44, a filter element 46, a pressure regulator 48 and a jet pump 50.

The reserve cup 32 is immersed in the fuel within the fuel tank 10, and stores fuel to be discharged outside the fuel tank 10. The suction filter 42, the fuel pump 44, the filter element 46, the pressure regulator 48 and the jet pump 50 are fixed within the reserve cup 32.

A heat sink guide rail 32a is formed on part of the bottom surface of the reserve cup 32. The lower end 28b of the heat sink 28 is engaged with the heat sink guide rail 32a. The lower end 28b of the heat sink 28 is consequently immersed in the fuel within the reserve cup 32 except when the fuel level within the reserve cup 32 is extremely low. The reserve cup 32 includes a guide engaging part, not shown, and the guide 24 is engaged with the guide engaging part. The reserve cup 32 can move vertically within the fuel tank 10 by being guided by the heat sink 28 and the guide 24. Since the reserve cup 32 is biased downward by the spring 25, the reserve cup 32 is in contact with the bottom surface of the fuel tank 10. The reserve cup 32 is consequently immersed in the fuel within the fuel tank 10.

A part of the bottom surface of the reserve cup 32 is formed so as to not be in contact with the fuel tank 10. A fuel inflow port 32b is formed in this part. A check valve 32c is attached to the fuel inflow port 32b. In a state where the fuel is stored in the fuel tank 10, the fuel within the fuel tank 10 enters the reserve cup 32 through the fuel inflow port 32b by operation of a jet pump 50 as described later. Therefore, the reserve cup 32 is filled with fuel unless the fuel in the fuel tank 10 runs out.

The fuel pump 44 is fixed within the reserve cup 32. The fuel pump 44 is electrically connected with the fuel pump controller 26. The fuel pump 44 operates by the power supply from the fuel pump controller 26. The fuel pump 44 draws fuel in the reserve cup 32 and discharges the drawn fuel with pressurization.

Figure 3:
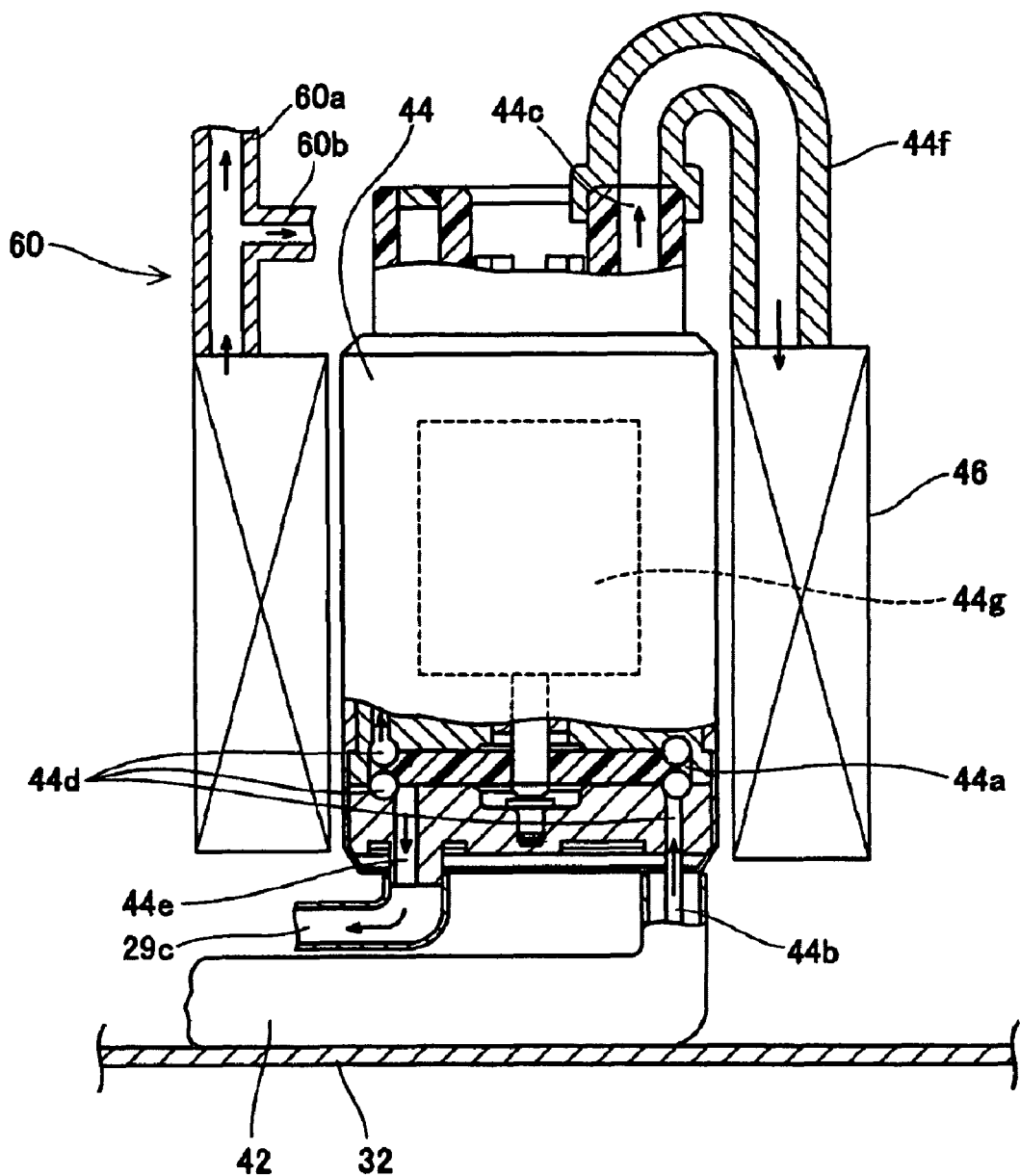
FIG. 3 is an illustrative view showing the flow of fuel in and around a fuel pump 44.

FIG. 3 is a view showing the flow of fuel in and around the fuel pump 44, wherein the arrow shows the direction of the fuel flow. As shown in FIG. 3, the fuel pump 44 comprises an impeller 44a and a motor 44g. The motor 44g is electrically connected to the fuel pump controller 26. The motor 44g operates using the power supply from the fuel pump controller 26 to rotate the impeller 44a.

The fuel pump 44 includes a suction port 44b, a discharge port 44c, and a passage 44d connecting the suction port 44b to the discharge port 44c. The passage 44d is formed so as to run along both the upper and lower surfaces of the impeller 44a. The suction filter 42 is attached to the suction port 44b. The discharge port 44c is connected to the filter element 46 by a pipe 44f. The fuel pump 44 further includes a vapor jet 44e connecting the passage 44d on the lower surface side of the impeller 44a with the outside. The pipe 29c is connected to the vapor jet 44e. The other end of the pipe 29c is connected with the inflow port 29b of the fuel discharge nozzle 29.

When the impeller 44a is rotated by the operation of the motor 44g, the fuel within the reserve cup 32 enters the passage 44d through the suction filter 42 and the suction port 44b. The fuel which has entered the passage 44d flows through the passage 44d from the upstream side to the downstream side while being pressurized. The pressurized fuel is discharged into the pipe 44f through the discharge port 44c. The fuel discharged to the pipe 44f enters the filter element 46. Part of the fuel drawn into the fuel pump 44 is discharged into the pipe 29c through the vapor jet 44e.

The suction filter 42 is disposed under the fuel pump 44 and attached to the suction port 44b. The suction filter 42 removes foreign material from the fuel drawn into the fuel pump 44. The fuel from which the foreign material has been removed, using the suction filter 42, enters the suction port 44b of the fuel pump 44.

The filter element 46 is disposed around the fuel pump 44. The upstream end of the filter element 46 is connected to the discharge port 44c of the fuel pump 44 by the pipe 44f. The downstream end of the filter element 46 is connected to the pipe 60. The filter element 46 removes foreign material from the fuel discharged from the fuel pump 44. The filter element 46 removes finer foreign material than the suction filter 42. The fuel from which the foreign material has been removed, using the filter element 46, is discharged into the pipe 60.

Midstream, the pipe 60 branches into the branch pipes 60a and 60b. The downstream end of the branch pipe 60a is connected to the fuel discharge port 22a of the cover 22. The downstream end of the branch pipe 60b is connected to the pressure regulator 48 shown in FIG. 2. The fuel from the filter element 46 enters the pipe 60. Most of the fuel which entered the pipe 60 flows to the fuel discharge port 22a through the branch pipe 60a. A part of the fuel which entered the pipe 60 flows to the pressure regulator 48 through the branch pipe 60b.

As shown in FIG. 2, the pressure regulator 48 is disposed within the reserve cup. The pressure regulator 48 discharges part of the fuel in the pipe 60 so that the fuel flowing in the pipe 60 has a predetermined pressure. An outlet of the pressure regulator 48 is connected to the jet pump 50 by a pipe 62. The fuel discharged from the pressure regulator 48 enters the jet pump 50 through the pipe 62.

The jet pump 50 is disposed within the reserve cup 32 near the bottom surface. The jet pump 50 is connected to the outlet of the pressure regulator 48 by the pipe 62. The jet pump 50 dispenses the fuel discharged from the pressure regulator 48 into the reserve cup 32. When the jet pump 50 dispenses the fuel, the pressure of the fuel near the fuel inflow port 32b is reduced by the flow of the fuel dispensed from the jet pump 50. The check valve 32c is opened hereby, and the fuel within the fuel tank 10 is drawn into the reserve cup 32 through the fuel inflow port 32b.

Figure 5:
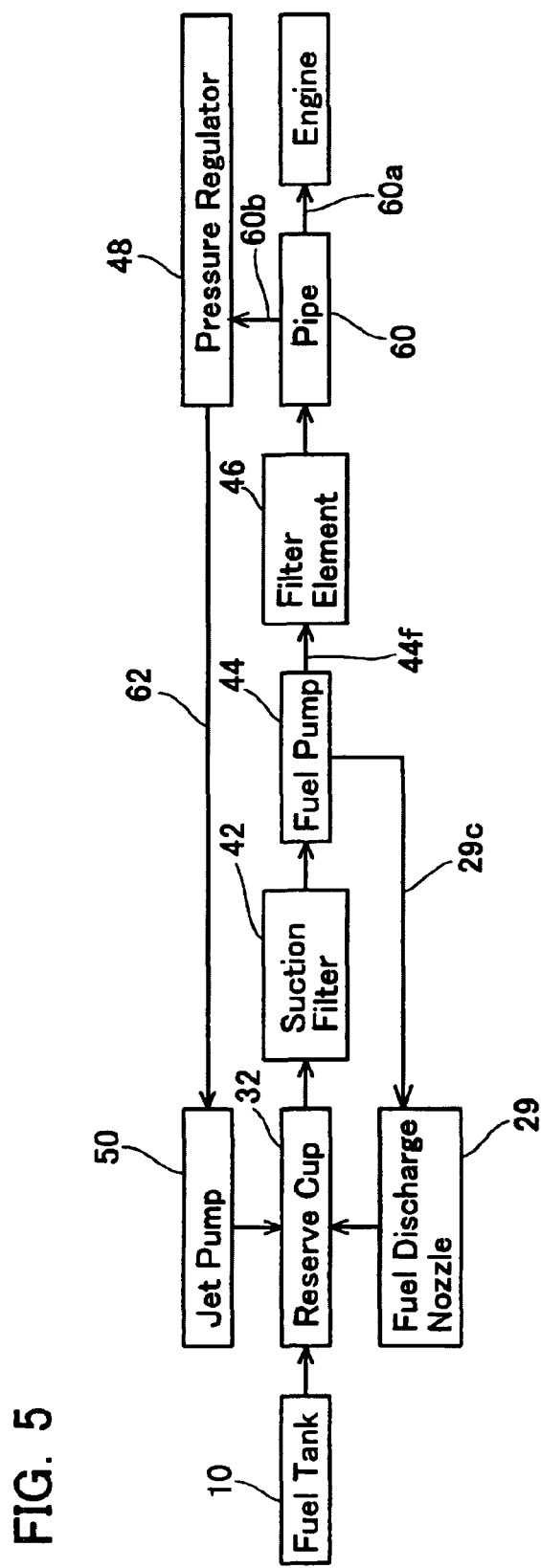
FIG. 5 is a block diagram showing the flow of fuel.

The flow of fuel during the operation of the fuel supply device 20 will be described. The block diagram in FIG. 5 shows the flow of fuel within the fuel supply device 20. When the fuel pump controller 26 supplies power to the fuel pump 44, the fuel pump 44 operates. When the fuel pump 44 operates, the fuel within the reserve cup 32 enters the suction filter 42. As the fuel passes through the suction filter 42, relatively large particles of foreign material are removed from the fuel. The fuel that passes through the suction filter 42 is drawn into the fuel pump 44. The fuel pump 44 discharges the drawn fuel with pressurization. The fuel discharged from the fuel pump 44 enters the filter element 46. In the filter element 46, relatively small particles of foreign material are removed from the fuel. The fuel that passes through the filter element 46 enters the pipe 60. Part of the fuel in the pipe 60 is discharged by the pressure regulator 48. The fuel within the pipe 60 is hereby kept at a predetermined pressure. The fuel kept at a predetermined pressure within the pipe 60 is guided to the fuel discharge port 22a of the cover 22 and supplied to the engine therethrough.

The fuel discharged from the pipe 60 by the pressure regulator 48 enters the jet pump 50. The jet pump 50 dispenses this fuel into the reserve cup 32. The fuel within the fuel tank 10 hereby enters the reserve cup 32 through the fuel inflow port 32b.

Part of the fuel drawn into the fuel pump 44 is discharged from the vapor jet 44e. The fuel discharged from the vapor jet 44e enters the fuel discharge nozzle 29 through the pipe 29c. The fuel which entered the fuel discharge nozzle 29 is discharged toward the heat sink 28 through each outlet port 29a. When the level of fuel within the fuel tank 10 is at a position higher than the fuel discharge nozzle 29, the fuel within the fuel tank 10 is carried toward the heat sink 28 by discharging the fuel from the fuel discharge nozzle 29. Cooling of the heat sink 28 is promoted by this flow of fuel past the heat sink 28. When the level of fuel within the fuel tank 10 is at a position lower than the fuel discharge nozzle 29, the fuel is directly discharged from the fuel discharge nozzle 29 onto the heat sink 28. Therefore, the cooling of the heat sink 28 is promoted.

When the fuel supply device 20 is operated, the fuel pump controller 26 controls the drive of the fuel pump 44. When the fuel pump controller 26 controls the drive of the fuel pump 44, heat is generated in the circuit board 26b of the fuel pump controller 26. The heat generated in the circuit board 26b is mostly transferred to the heat sink 28 having high heat conductivity. The lower end 28b of the heat sink 28 is immersed into the fuel within the reserve cup 32 as described above except when the fuel in the reserve cup 32 runs out. The heat dissipates from the heat sink 28 into the fuel within the reserve cup 32 because the fuel within the reserve cup 32 has a relatively low temperature in comparison to the heat sink. Furthermore, fuel is discharged from the fuel discharge nozzle 29 toward the heat sink 28, and the heat sink 28 is cooled also with this fuel.

As descried above, the heat transferred from the circuit board 26b to the heat sink 28 is suitably transferred from the heat sink 28 to fuel. The increase in the temperature of the circuit board 26b is consequently suppressed.

As described so far, in the fuel supply device 20, the lower end 28b of the heat sink 28 is engaged with the fuel discharging unit 30. Namely, the heat sink 28 functions as a member guiding the fuel discharging unit 30. Therefore, the capacity and surface area of the heat sink 28 are increased without enlarging the fuel supply device 20. That is, the heat sink can perform better, and the increases in the temperature of the fuel pump controller 26 are sufficiently suppressed. Since the heat sink 28 functions as a guide, the number of part items constituting the fuel supply device 20 is consequently reduced, and the manufacturing assembly man-hours for the fuel supply device 20 are reduced.

In the above-mentioned fuel supply device 20, the lower end 28b of the heat sink 28 is immersed in fuel in the reserve cup 32. By disposing the heat sink 28 in this manner, the heat sink 28 is cooled by the fuel within the reserve cup 32, and the increase in the temperature of the control unit is further suppressed.

In the above-mentioned fuel supply device 20, the heat sink 28 is formed in a substantially rectangular plate-like shape. As a result of such a structure, instability between the heat sink 28 and the mounting part of the fuel discharging unit 30 is minimized. Consequently, the fuel discharging unit 30 can be accurately disposed within the fuel tank 10.

In the above-mentioned fuel supply device 20, the fuel discharged from the vapor jet 44e is discharged from the fuel discharge nozzle 29 toward the heat sink 28. The heat sink 28 is suitably cooled hereby, and the increase in the temperature of the fuel pump controller 26 is further suppressed.

In the above-mentioned fuel supply device 20, each discharge port 20a of the fuel discharge nozzle 29 is formed so as to be aligned along the lateral direction of the heat sink 28. Since the fuel is thus discharged across the entire lateral surface of the heat sink 28 from the fuel discharge nozzle 29, the heat sink 28 is efficiently cooled.

In the above-mentioned fuel supply device 20, the fuel discharged from the vapor jet 44e is discharged from the fuel discharge nozzle 29 toward the heat sink 28. However, part of fuel flowing through various regions within the fuel supply device 20 can be supplied to the fuel discharge nozzle 29 and dispensed toward the heat sink 28. For example, part of the fuel flowing in the pipe 60 can be supplied to the fuel discharge nozzle 29. The fuel discharged from the pressure regulator 48 can be supplied to the fuel discharge nozzle 29. When the fuel discharged from the pressure regulator 48 is supplied to the fuel discharge nozzle 29, the jet pump 50 can be operated by supplying the fuel discharged from the vapor jet 44e to the jet pump 50 or by supplying part of the fuel flowing in the pipe 60 to the jet pump 50.

Figure 6:
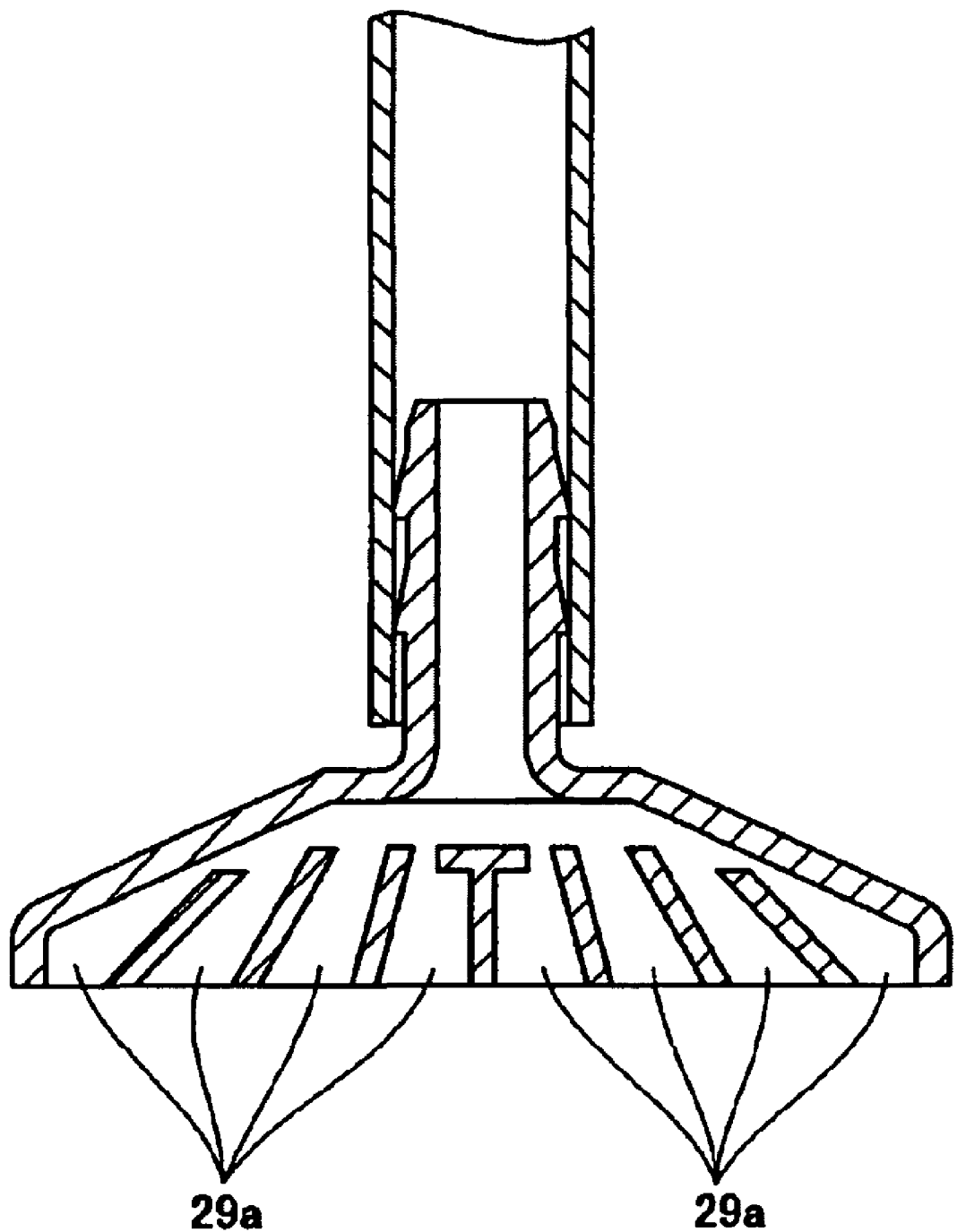
FIG. 6 is a view showing a fuel discharge nozzle of another form.

In the above-mentioned fuel supply device 20, each outlet port 29a of the fuel discharge nozzle 29 is formed so as to be aligned along the lateral direction of the heat sink 28. However, the outlet port 29a of the fuel discharge nozzle 29 can be formed in any shape (as shown in FIG. 6) as long as the outlet port 29a is formed so that fuel is discharged a substantial area of the entire lateral surface of the heat sink 28 from the fuel discharge nozzle 29.

In the above-mentioned fuel supply device 20, the heat sink 28 is formed from copper. However, the heat sink can be formed from other materials that have high levels of heat conductivity. For example, metallic materials such as Ag, Au, Fe, Al, Ni, Cr, Ti, Pt, Pb, Sn, W, Co, and Zn, and alloy materials, ceramic materials, glass materials or the like, including materials that contain a combination of these material, are preferably used. Furthermore, resin materials formed by mixing glass fiber, ferrite fiber or the like thereto can also be used.

Finally, although the preferred representative embodiment has been described in detail, the present embodiment is for illustrative purpose only and is not restrictive. It is to be understood that various changes and modifications may be made without departing from the sprit or scope of the appended claims. In addition, the additional features and aspects disclosed herein also may be utilized singularly or in combination with the above aspects and features.

What is claimed is:

1. An apparatus, comprising:
   a fuel tank;
   a cover attached to the fuel tank, the cover closing an opening formed in an upper portion of the fuel tank;
   a fuel discharging unit disposed within the fuel tank, the fuel discharging unit drawing fuel from the fuel tank and discharging the drawn fuel outside the fuel tank;
   a biasing member disposed between the cover and the fuel discharging unit, the biasing member biasing the fuel discharging unit toward a bottom surface of the fuel tank;
   a control unit for controlling the fuel discharging unit; and
   a heat sink thermally connected to the control unit, the heat sink dissipating heat from the control unit, wherein the heat sink includes an extended portion extending in an up-down direction in the fuel tank, and wherein the fuel discharging unit is slidably supported by the extended portion.

2. The apparatus of claim 1, wherein the fuel discharging unit comprises a reserve cup for storing fuel, and a leading edge of the extended portion is positioned in the fuel stored in the reserve cup when the reserve cup stores fuel.

3. The apparatus of claim 1, wherein the extended portion is formed in a plate-like shape.

* * * * *